(12) United States Patent
Yoneyama et al.

(10) Patent No.: US 12,525,689 B2
(45) Date of Patent: Jan. 13, 2026

(54) BATTERY AND METHOD OF MANUFACTURING THE SAME

(71) Applicant: Prime Planet Energy & Solutions, Inc., Tokyo (JP)

(72) Inventors: Akihiro Yoneyama, Kobe (JP); Ryoichi Wakimoto, Kobe (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 608 days.

(21) Appl. No.: 17/891,136

(22) Filed: Aug. 19, 2022

(65) Prior Publication Data

US 2023/0061024 A1  Mar. 2, 2023

(30) Foreign Application Priority Data

Aug. 25, 2021  (JP) ................ 2021-137242

(51) Int. Cl.
| | | |
|---|---|---|
| *H01M 10/0587* | (2010.01) | |
| *H01M 10/0525* | (2010.01) | |
| *H01M 50/103* | (2021.01) | |
| *H01M 50/188* | (2021.01) | |
| *H01M 50/46* | (2021.01) | |
| *H01M 50/533* | (2021.01) | |
| *H01M 50/538* | (2021.01) | |
| *H01M 50/543* | (2021.01) | |

(52) U.S. Cl.
CPC ..... *H01M 50/538* (2021.01); *H01M 10/0525* (2013.01); *H01M 10/0587* (2013.01); *H01M 50/103* (2021.01); *H01M 50/188* (2021.01); *H01M 50/461* (2021.01); *H01M 50/533* (2021.01); *H01M 50/543* (2021.01)

(58) Field of Classification Search
CPC .......... H01M 10/0587; H01M 50/103; H01M 50/188; H01M 50/461
See application file for complete search history.

(56) References Cited

U.S. PATENT DOCUMENTS

| | | | |
|---|---|---|---|
| 2014/0045021 A1* | 2/2014 | Okutani | ............ H01M 10/0568 429/162 |
| 2016/0336548 A1 | 11/2016 | Kobayashi et al. | |
| 2017/0125848 A1* | 5/2017 | Wakimoto | .......... H01M 4/0471 |
| 2019/0221822 A1 | 7/2019 | Wakimoto | |
| 2020/0251711 A1* | 8/2020 | Wakimoto | .......... H01M 50/184 |
| 2020/0295339 A1* | 9/2020 | Kwak | ................ H01M 50/536 |
| 2021/0202977 A1* | 7/2021 | Su | ..................... H01M 10/0431 |
| 2022/0352606 A1 | 11/2022 | Wakimoto et al. | |

(Continued)

FOREIGN PATENT DOCUMENTS

| | | | | |
|---|---|---|---|---|
| EP | 2492992 A1 * | 8/2012 | ............ | C09J 7/0246 |
| JP | 2016-219143 A | 12/2016 | | |
| JP | 201750069 A | 3/2017 | | |

(Continued)

*Primary Examiner* — Kevin E Yoon
(74) *Attorney, Agent, or Firm* — HAUPTMAN HAM, LLP

(57) ABSTRACT

A battery in which an electrode tab group is less likely to be damaged is provided. The battery disclosed herein includes an exterior body, a sealing plate, an electrode body, an electrode body holder, a positive electrode terminal, a negative electrode terminal, a positive electrode current collector, and a negative electrode current collector. The electrode body is fixed to the inner wall surface of the electrode body holder.

1 Claim, 9 Drawing Sheets

(56) References Cited

U.S. PATENT DOCUMENTS

2023/0031407 A1\* 2/2023 Kusada ............... H01M 10/052

FOREIGN PATENT DOCUMENTS

| JP | 2017-162716 A | 9/2017 | | |
|----|---------------|--------|----|----|
| JP | 2019-125493 A | 7/2019 | | |
| WO | 2020/066476 A1 | 4/2020 | | |
| WO | 2021/060009 A1 | 4/2021 | | |
| WO | WO-2021131877 A1 \* | 7/2021 | .......... | H01M 10/052 |

\* cited by examiner

BATTERY AND METHOD OF MANUFACTURING THE SAME

CROSS REFERENCE TO RELATED APPLICATIONS

The present application is based upon and claims the benefit of priority from Japanese patent application No. 2021-137242 filed on Aug. 25, 2021, and the entire disclosure of which is incorporated herein in its entirety by reference.

BACKGROUND OF THE DISCLOSURE

1. Technical Field

The present disclosure relates to a battery and a method of manufacturing the same.

2. Background

A battery such as a lithium-ion secondary battery generally includes: an electrode body including an electrode; an exterior body having an opening and housing the electrode; a sealing plate sealing the opening of the exterior body; a terminal electrically connected to the electrode inside the exterior body and extending from the sealing plate toward outside of the exterior body; and a current collector electrically connected to the electrode and the terminal. A known configuration of this type of battery is typically such that the electrode is provided with an electrode tab group including multiple electrode tabs for current collection and the electrode is connected to the terminal with the electrode tab group interposed therebetween.

Japanese Patent Application Publication No. 2017-50069 discloses a battery where positive electrode tabs and negative electrode tabs are provided at both ends of an electrode assembly (electrode body) in the width direction. In this document, these electrode tabs are bent along end surfaces of the electrode assembly in the width direction, and bends of the electrode tabs are connected (bonded) to the current collector.

SUMMARY OF THE INVENTION

Vibrations, shock, and the like are applied from the outside to the battery. The electrode tabs are made of, for example, portions of an electrode substrate, and are soft and susceptible to external forces. For example, when external forces are applied to the electrode tab group in the width direction of the electrode body, the electrode body is displaced from a predetermined arrangement position, the electrode tab group (a positive electrode tab group and/or a negative electrode tab group) is drawn in the same direction, or pushed against the electrode body or the inner wall of the exterior body. Such a load on the electrode tab group is undesirable because it is a cause of damage to the electrode tab group. If the electrode tab group is damaged, the electrical connection between the electrode and the terminal may become unstable or poor.

The present disclosure was made in view of the problems, and intended to provide a battery in which the electrode tab group is less likely to be damaged.

According to the technology disclosed herein, provided is a battery including: an exterior body having a bottom wall, a pair of first side walls extending from the bottom wall and facing each other, a pair of second side walls extending from the bottom wall and facing each other, and an opening facing the bottom wall; a sealing plate sealing the opening; an electrode body housed in the exterior body and including a positive electrode, a negative electrode, and a separator separating between the positive electrode and the negative electrode; an electrode body holder housing the electrode body, made of resin, and housed in the exterior body with the electrode body housed in the electrode body holder; a positive electrode terminal and a negative electrode terminal which are attached to the sealing plate; and a positive electrode current collector which electrically connects between the positive electrode and the positive electrode terminal of the electrode body and a negative electrode current collector which electrically connects between the negative electrode and the negative electrode terminal of the electrode body. The electrode body has a pair of first side surfaces facing the first side walls. At a first end of the electrode body in a facing orientation of the first side surfaces, a positive electrode tab group including multiple positive electrode tabs protruding from the first end is provided. At a second end of the electrode body different from the first end in a facing orientation of the first side surfaces, a negative electrode tab group including multiple negative electrode tabs protruding from the second end is provided. In the positive electrode tab group, the tips of the positive electrode tabs constituting the positive electrode tab group are bent so as to be arranged along one of the second side walls, and portions of the positive electrode tabs bent are bonded to the positive electrode current collector. In the negative electrode tab group, tips of the negative electrode tabs constituting the negative electrode tab group are bent so as to be arranged along the other second side wall, and portions of the negative electrode tabs bent are bonded to the negative electrode current collector. The electrode body is fixed to an inner wall surface of the electrode body holder.

In the battery with this configuration, the electrode body is fixed to the inner wall surface of the electrode body holder. Thus, if external forces such as vibrations and shock are applied to the battery from the outside, movement of the electrode body in the exterior body (specifically, the movement in a facing orientation of the first side surfaces) can be reduced. This allows reduction in load on the electrode tab group due to the movement of the electrode body and reduction in damage to the electrode tab group. The "positive electrode tabs" and "negative electrode tabs" herein may be referred to as "electrode tabs" when no particular distinction is made between positive and negative. The same applies to the "electrode current collector."

In a preferred aspect, the battery disclosed herein further includes a first adhesive layer between at least one of the first side surfaces of the electrode body and the inner wall surface of the electrode body holder, wherein the electrode body is fixed to the inner wall surface with the first adhesive layer interposed therebetween. In the battery with this configuration, the first adhesive layer is provided in the portion. This efficiently achieves the effect of reducing damage to the electrode tab group.

In another preferred aspect, the first adhesive layer is provided in at least a portion of the inner wall surface of the electrode body holder or at least a portion of the first side surface of the electrode body. This configuration facilitates manufacturing of the battery in addition to the effects.

In another preferred aspect, the separator has an adhesive separator including a substrate and a second adhesive layer provided on at least a portion of the surface of the substrate, and at least a portion of the second adhesive layer constitutes the first side surface, and the electrode body is fixed to the inner wall surface with the second adhesive layer interposed therebetween. This configuration facilitates manufacturing of the battery in addition to the effects. In addition, when the battery includes multiple electrode bodies, displacement of the electrode bodies can be reduced.

In another aspect of the battery disclosed herein, an area of the first adhesive layer or the second adhesive layer is ⅓ or less of the area of the first side surface. This configuration facilitates impregnation of the electrolyte to the electrode body in addition to the effects.

According to the technology disclosed herein, provided is a method of manufacturing a battery including: an exterior body having a bottom wall, a pair of first side walls extending from the bottom wall and facing each other, a pair of second side walls extending from the bottom wall and facing each other, and an opening facing the bottom wall; a sealing plate sealing the opening; an electrode body which is housed in the exterior body and including a positive electrode, a negative electrode, and a separator separating between the positive electrode and the negative electrode and which has a pair of first side surfaces facing the first side walls; an electrode body holder housing the electrode body, made of resin, and housed in the exterior body with the electrode body housed in the electrode body holder; a positive electrode terminal and a negative electrode terminal which are attached to the sealing plate; and a positive electrode current collector which electrically connects between the positive electrode and the positive electrode terminal of the electrode body and a negative electrode current collector which electrically connects between the negative electrode and the negative electrode terminal of the electrode body. The manufacturing method includes: bending a positive electrode tab group provided at a first end of the electrode body in a facing orientation of the first side surfaces and including multiple positive electrode tabs protruding from the first end so that tips of the positive electrode tabs constituting the positive electrode tab group are arranged along one of the second side walls and bonding portions of the positive electrode tabs bent and the positive electrode current collector to each other; bending a negative electrode tab group provided at a second end of the electrode body different from the first end in a facing orientation of the first side surfaces and including multiple negative electrode tabs protruding from the second end so that tips of the negative electrode tabs constituting the negative electrode tab group are arranged along the other second side wall and bonding portions of the negative electrode tabs bent and the negative electrode current collector to each other; housing the electrode body in the electrode body holder with the positive electrode tab group and the negative electrode tab group being bonded to the positive electrode current collector and the negative electrode current collector, respectively; and applying pressure and/or energy to the electrode body holder housing the electrode body and fixing the first side surfaces to the inner wall surface of the electrode body holder.

With this configuration, the electrode body is fixed to the inner wall surface of the electrode body holder. Thus, if external forces such as vibrations and shock are applied to the battery from the outside, movement of the electrode body in the exterior body (specifically, the movement in a facing orientation of the first side surfaces) can be reduced. The above-described manufacturing method allows a battery in which damage to the electrode tab group is reduced to be manufactured.

The manufacturing method preferably includes: forming a first adhesive layer between at least one of the first side surfaces and the inner wall surface of the electrode body holder and fixing the first side surface and the inner wall surface to each other with the first adhesive layer interposed therebetween. With this configuration, the first adhesive layer is formed in the portion. This efficiently achieves the effect of reducing damage to the electrode tab group.

In the manufacturing method, it is preferred that as the separator, an adhesive separator including a substrate and a second adhesive layer provided on at least a portion of the surface of the substrate is used, the first side surface is formed of at least a portion of the second adhesive layer, and the first side surface and the inner wall surface are fixed to each other with the second adhesive layer interposed therebetween. This configuration facilitates manufacturing of the battery in addition to the effects. This further allows a battery which includes multiple electrode bodies and in which displacement of the electrode bodies from each other is reduced to be manufactured.

Further, in another aspect, the manufacturing method disclosed herein further includes: housing the electrode body holder housing the electrode body in the exterior body; and sealing the exterior body with the sealing plate after the housing. The fixation is performed by applying pressure and/or energy to the first side wall of the exterior body after the sealing. With this configuration, damage to the electrode body to which pressure or energy is applied during the fixation can be reduced.

The energy is preferably thermal energy, optical energy, or ultrasonic energy. In the manufacturing method disclosed herein, the energy is applied for the fixation. Thus, a battery having desired effects can be efficiently manufactured.

BRIEF DESCRIPTION OF THE DRAWINGS

FIG. 1 is an exploded perspective view schematically illustrating a battery 1 according to an embodiment.

DETAILED DESCRIPTION OF THE PREFERRED EMBODIMENTS

Some preferred embodiments of the technology disclosed herein will be described below with reference to the accompanying drawings. The matters necessary for executing the technology disclosed herein (e.g., the commonly used configuration and manufacturing processes of the battery which does not characterize the technology disclosed herein (the secondary battery in the technology disclosed herein)), except for matters specifically herein referred to can be grasped as design matters of those skilled in the art based on the related art in the preset field. The technology disclosed herein can be executed based on the contents disclosed herein and the technical knowledge in the present field.

The "secondary battery" herein is a term that indicates all electricity storage devices that can be repeatedly charged and discharged, and is a concept that encompasses so-called secondary batteries (chemical batteries) such as a lithium-ion secondary battery and a nickel hydrogen battery and capacitors (physical batteries) such as an electric double layer capacitor. The secondary battery herein is also referred to as simply "battery."

<Battery 1>

Figure 1:
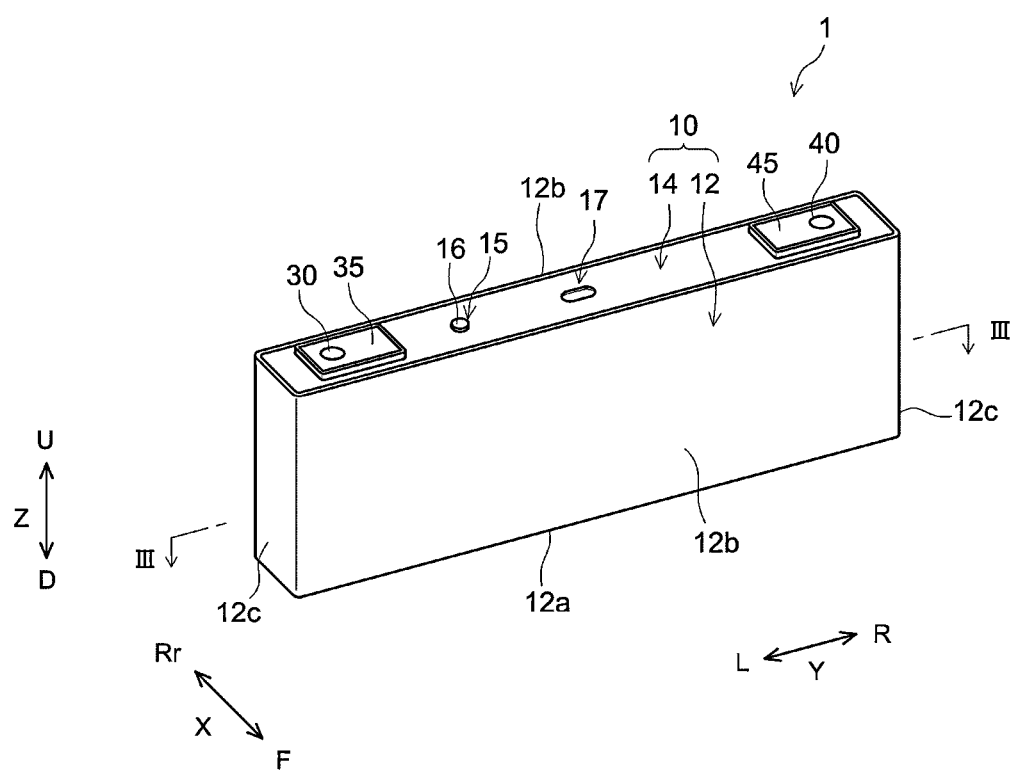
FIG. 1 is a perspective view schematically illustrating a battery 1 according to an embodiment.
Figure 2:
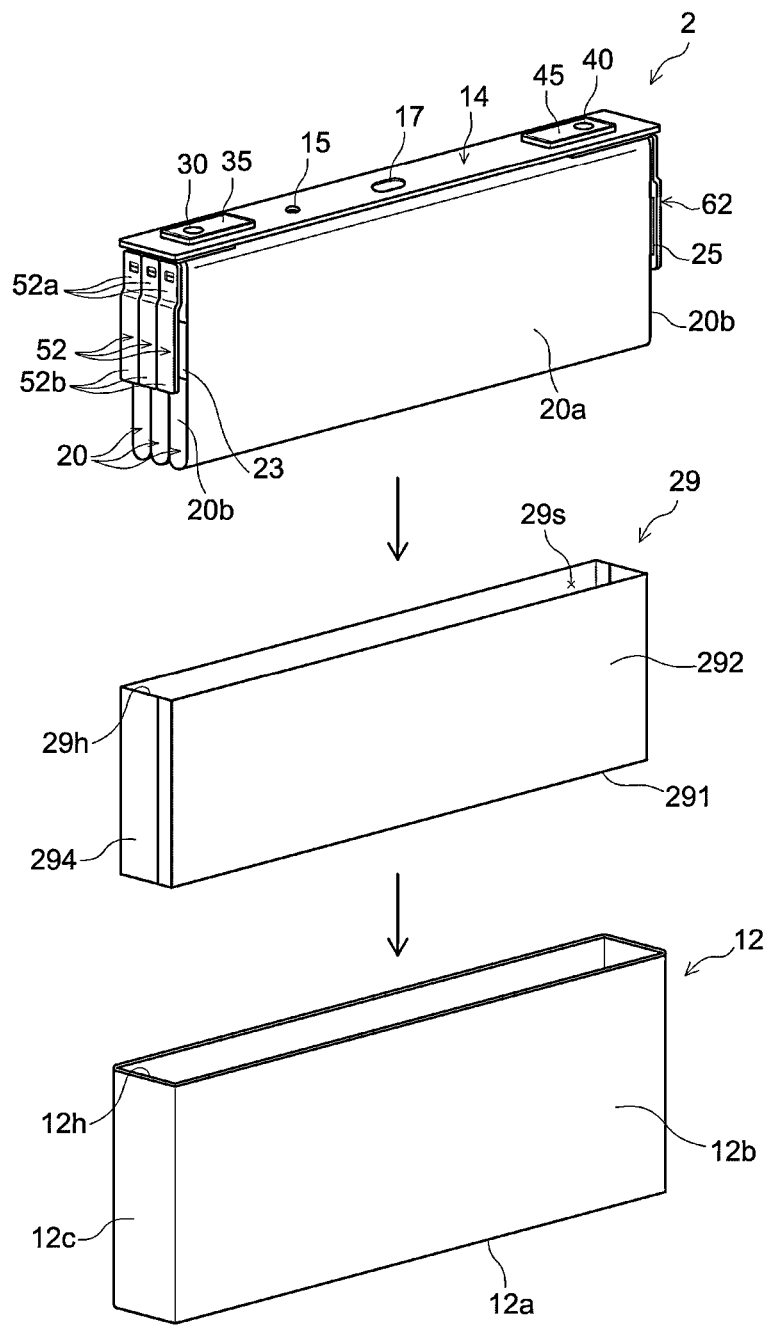
Figure 3:
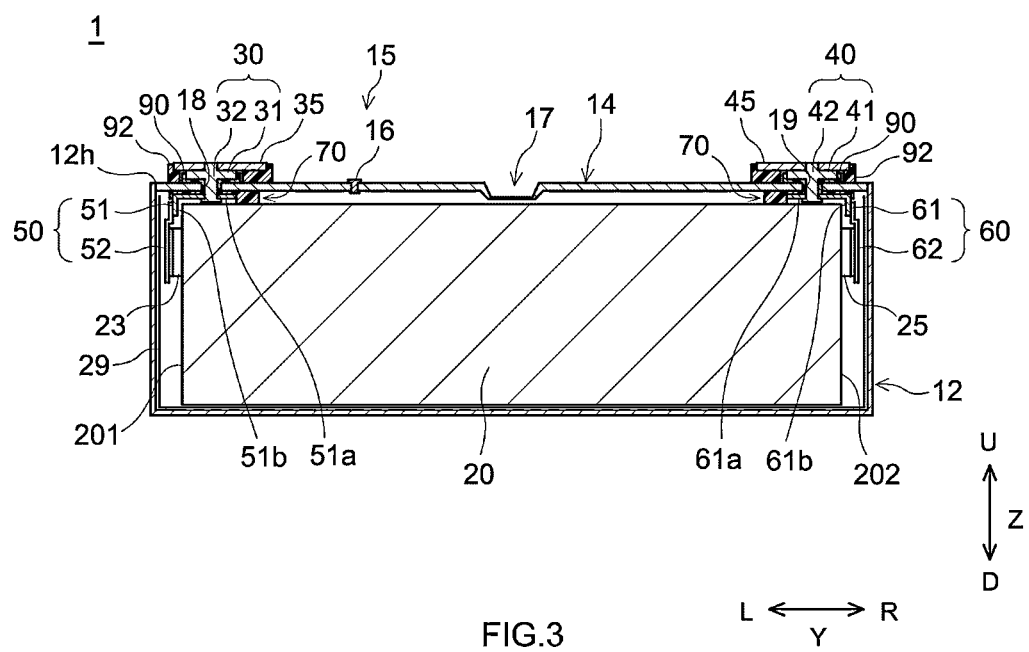
FIG. 3 is a schematic sectional view taken along line III-III of FIG. 1.

FIG. 1 is a perspective view schematically illustrating a battery 1 according to an embodiment. FIG. 2 is an exploded perspective view schematically illustrating the battery 1 according to an embodiment. FIG. 3 is a schematic sectional view taken along line III-III of FIG. 1. In each drawing which is herein referred to, the reference sign X indicates the "depth direction," the reference sign Y indicates the "width direction," and the reference sign Z indicates the "height direction." In the depth direction X, F indicates "front" and Rr indicates "rear." In the width direction Y, L indicates "left" and R indicates "right." In the height direction Z, U indicates "up" and D indicates "down." Such directions are defined for convenience of explanation and are not intended to limit the installation configuration of the battery 1.

As shown in FIGS. 1 to 3, a battery 1 includes a battery case 10, an electrode body 20, an electrode body holder 29, a positive electrode terminal 30, a negative electrode terminal 40, a positive electrode current collector 50, a negative electrode current collector 60, an insulator 70, and a gasket 90. Although not shown in the drawings, the battery 1 further includes an electrolyte. The battery 1 herein is a lithium-ion secondary battery.

The battery case 10 is a housing for housing the electrode body 20. The battery case 10 herein has a flat, bottomed rectangular (square) outside shape. The material of the battery case 10 may be the same as commonly used material without particular limitations. The material of the battery case 10 is preferably metal, and more preferably aluminum, an aluminum alloy, iron, an iron alloy, or the like, for example. The battery case 10 further houses an electrolyte (not shown) in addition to the electrode body 20. As the electrolyte, any electrolyte which can be used in lithium-ion secondary batteries can be used without particular limitations, and the electrolyte does not characterize the technology disclosed herein. Thus, the detailed description thereof is omitted.

The battery case 10 includes an exterior body 12 having an opening 12h and a sealing plate (lid) 14 sealing the opening 12h. As shown in FIGS. 1 and 2, the exterior body 12 has a flat rectangular bottom wall 12a, a pair of long side walls 12b extending from the respective long sides of the bottom wall 12a in the height direction Z and facing each other, and a pair of short side walls 12c extending from the respective short sides of the bottom wall 12a in the height direction and facing each other. Each long side wall 12b is an example of the first side wall in the battery disclosed herein. Each short side wall 12c is an example of second side wall in the battery disclosed herein. The bottom wall 12a faces the opening 12h. The area of each short side wall 12c is larger than the area of the long side wall 12b. The sealing plate 14 seals the opening 12h of the exterior body 12. The sealing plate 14 faces the bottom wall 12a of the exterior body 12. The sealing plate 14 has a substantially rectangular shape in plan view. The battery case 10 is integrated by the sealing plate 14 bonded to the periphery of the opening 12h of the exterior body 12. The battery case 10 is hermetically sealed (airtight).

The sealing plate 14 is provided with a liquid injection hole 15, a gas discharge valve 17, and two terminal outlets 18 and 19. The liquid injection hole 15 is for injecting an electrolyte after assembling of the sealing plate 14 to the exterior body 12. The liquid injection hole 15 is sealed with a sealing member 16. The gas discharge valve 17 is thin portion configured to be broken and to discharge gas inside the battery case 10 to the outside when the pressure inside the battery case 10 exceeds a predetermined value. The terminal outlets 18 and 19 are formed in both ends of the sealing plate 14 in the width direction Y. The terminal outlets 18 and 19 penetrate the sealing plate 14 in the height direction Z. The terminal outlets 18 and 19 have inner diameters which allow the positive electrode terminal 30 and the negative electrode terminal 40 to be inserted thereinto respectively before being attached to the sealing plate 14 (before being crimping-processed).

The positive electrode terminal 30 and the negative electrode terminal 40 are both attached to the sealing plate 14. The positive electrode terminal 30 is arranged on one side of the sealing plate 14 in the width direction Y (left side in FIGS. 1 to 3). The negative electrode terminal 40 is arranged on one side of the sealing plate 14 in the width direction Y (right side in FIGS. 1 to 3). For the positive electrode terminal 30, aluminum or the like is used, for example. For the negative electrode terminal 40, copper or the like is used, for example.

The positive electrode terminal 30 includes a flat plate-like base 31 arranged on the outer surface of the sealing plate 14 and a shaft 32 extending downward (toward the bottom wall 12a) from the base 31 in the height direction Z. The base 31 of the positive electrode terminal 30 is exposed on the outer surface of the sealing plate 14. The shaft 32 of the positive electrode terminal 30 extends from the outside of the sealing plate 14 through the terminal outlet 18. The shaft 32 is fixed to the positive electrode first current collector 51 through the through hole of the positive electrode first current collector 51 of the positive electrode current collector 50 to be described later inside the battery case 10. The positive electrode terminal 30 is fixed to the periphery surrounding the terminal outlet 18 of the sealing plate 14 by crimping (riveting) processing. In the battery 1, the negative electrode terminal 40 also has substantially the same structure as the positive electrode terminal 30. Thus, the detailed illustration and description of the structure of the negative electrode terminal 40 is omitted. In FIG. 3, the reference numeral 41 indicates the base of the negative electrode terminal 40, and the reference numeral 42 indicates the shaft.

A plate-like positive electrode external electroconductive member 35 and a plate-like negative electrode external electroconductive member 45 are attached to the outer surface of the sealing plate 14. The positive electrode external electroconductive member 35 is electrically connected to the positive electrode terminal 30. The negative electrode external electroconductive member 45 is electrically connected to the negative electrode terminal 40. The positive electrode external electroconductive member 35 and the negative electrode external electroconductive member 45 are members to which busbars are attached when multiple batteries 1 are electrically connected to each other. The positive electrode external electroconductive member 35 and the negative electrode external electroconductive member 45 are made of aluminum or an aluminum alloy, for example. The positive electrode external electroconductive member 35 and the negative electrode external electroconductive member 45 are insulated from the sealing plate 14 by an external insulating member 92. The positive electrode external electroconductive member 35 and the negative electrode external electroconductive member 45 are not essential and can be omitted in other embodiments. As the constituent material for the external insulating member 92, resin materials listed as constituent materials for the insulator 70 and the gasket 90 to be described later can be used.

The insulator 70 is arranged between the positive electrode current collector 50 (specifically, a terminal connection portion 51a of the positive electrode first current collector 51) and the inner surface of the sealing plate 14. The insulator 70 has a through hole. The gasket 90 is arranged between the positive electrode terminal 30 (specifically, the base 31) and the outer surface of the sealing plate 14. The gasket 90 has a tubular protrusion inserted into the terminal outlet 18 of the sealing plate 14. The protrusion of the gasket 90 is arranged along the inner periphery of the through hole of the insulator 70. The insulator 70 and the gasket 90 having the above-described configurations provided allow reduction in contact between the positive electrode current collector 50 and the sealing plate 14 and the contact between the positive electrode terminal 30 and the sealing plate 14. The same insulating structure as that using the insulator and the gasket is also provided in the negative electrode terminal 40. Thus, the detailed description thereof is omitted. The constituent material for the insulator 70 and the gasket 90 are not particularly limited, and can be resin materials such as polyolefin resins (e.g., polypropylene (PP), polyethylene (PE)) and fluorine resins (e.g., perfluoroalkoxyalkane (PFA), polytetrafluoroethylene (PTFE)).

The battery 1 has one or more electrode bodies 20. In the embodiment shown in FIG. 2, the battery 1 includes three electrode bodies 20. As shown in FIG. 3, the battery 1 includes a positive electrode current collector 50 which electrically connects the positive electrode of the electrode body 20 and the positive electrode terminal 30 and a negative electrode current collector 60 which electrically connects the negative electrode of the electrode body 20 and the negative electrode terminal 40, inside the exterior body 12.

Figure 4:
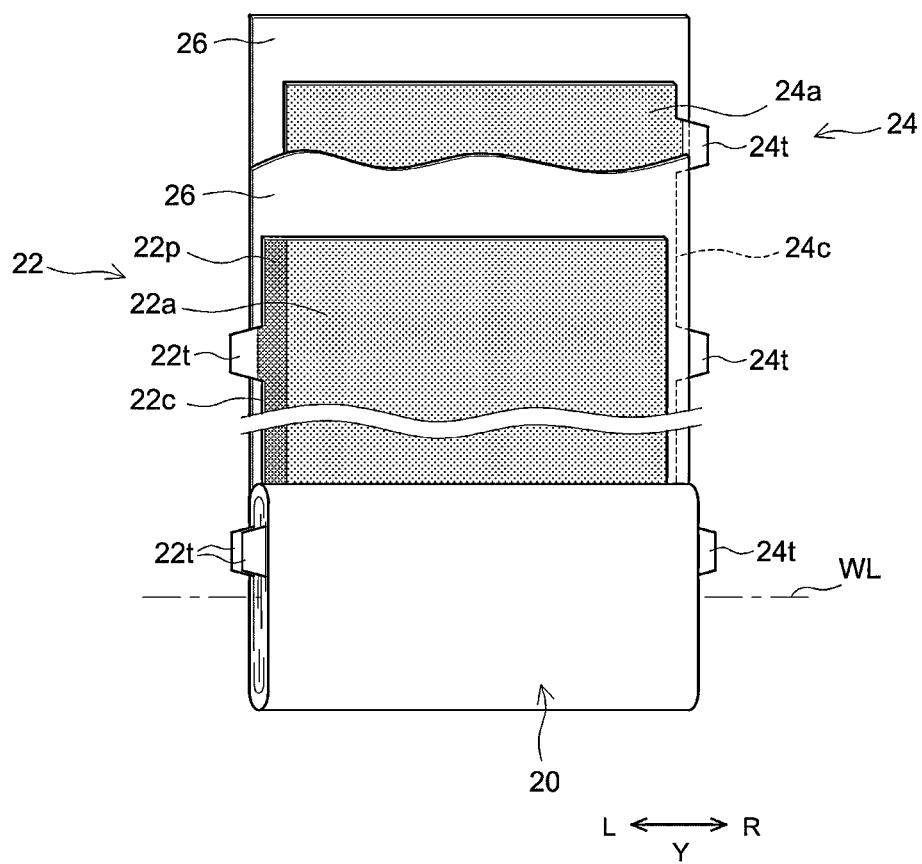
FIG. 4 is a schematic view illustrating a configuration of an electrode body 20.

FIG. 4 is a schematic view illustrating a configuration of an electrode body 20. As shown in FIG. 4, the electrode body 20 includes a positive electrode, a negative electrode, and a separator separating between the positive electrode and the negative electrode (the positive electrode plate 22, the negative electrode plate 24, and the separator 26 in FIG. 4).

The electrode body 20 herein is a flat wound electrode body configured such that a strip-like positive electrode plate 22 and a strip-like negative electrode plate 24 are stacked with a strip-like separator 26 interposed therebetween, and wound around the winding axis WL. As the constituent material for the positive electrode plate 22, the negative electrode plate 24, and the separator 26, materials used in this kind of lithium-ion secondary batteries can be used without particular limitations. The constituent materials do not characterize the technology disclosed herein. Thus, detailed description thereof is omitted.

The electrode body 20 includes a pair of wide first side surfaces 20a and a pair of second side surfaces 20b each having a rectangular portion and two curved portions sandwiching the rectangular portion. As shown in FIGS. 1 to 4, the electrode body 20 is arranged inside the exterior body 12 so that the winding axis WL is parallel with the width direction Y. Specifically, the electrode body 20 is arranged inside the exterior body 12 so that the winding axis WL is parallel with the bottom wall 12a and orthogonal to the short side walls 12c. Each first side surface 20a faces each long side wall 12b of the exterior body 12, and each second side surface 20b faces each short side wall 12c. At the first end 201 of the electrode body 20 in a facing orientation (e.g., the width direction Y in FIGS. 1 to 4) of the first side surfaces 20a, a positive electrode tab group 23 including multiple positive electrode tabs 22t protruding from the first end 201 is provided. The first end 201 is an end facing each short side wall 12c close to the positive electrode current collector 50 (on the left side in the width direction Y in FIG. 3). At the second end 202 of the electrode body 20 different from the first end 201 in a facing orientation of the first side surfaces 20a, a negative electrode tab group 25 including multiple negative electrode tabs 24t protruding from the second end 202 is provided. The second end 202 is an end facing each short side wall 12c close to the negative electrode current collector 60 (on the right side in the width direction Yin FIG. 3).

The positive electrode plate 22 is, as shown in FIG. 4, a long strip-like member. The positive electrode plate 22 includes a positive electrode collector foil 22c and a positive electrode active material layer 22a fixed to at least one surface of the positive electrode collector foil 22c. Although not particularly limited thereto, one side edge of the positive electrode plate 22 in the width direction Y may be provided with a positive electrode protective layer 22p, if necessary.

At one end of the strip-like positive electrode collector foil 22c in the width direction Y (left end in FIG. 4), multiple positive electrode tabs 22t are provided. The positive electrode tabs 22t protrude toward one side in the width direction Y (left side in FIG. 4). The positive electrode tabs 22t protrude further in the width direction Y than the separator 26. The positive electrode tabs 22t are spaced (intermittently) along the longitudinal direction of the positive electrode plate 22. The positive electrode tabs 22t each have a trapezoid shape. Each positive electrode tab 22t is part of the positive electrode collector foil 22c, and made of a metal foil (e.g., an aluminum foil). The positive electrode tabs 22t are portions (current collector foil exposing portion) of the positive electrode collector foil 22c where the positive electrode active material layer 22a and the positive electrode protective layer 22p are not formed. However, the positive electrode tabs 22t may be members separate from the positive electrode collector foil 22c.

Similarly to the positive electrode plate 22, the negative electrode plate 24 is also a long strip-like member. As shown in FIG. 4, the negative electrode plate 24 includes a negative electrode current collector foil 24c and a negative electrode active material layer 24a fixed to at least one surface of the negative electrode current collector foil 24c.

At one end of the strip-like negative electrode current collector foil 24c in the width direction Y (right end in FIG. 4), multiple negative electrode tabs 24t are provided. The negative electrode tabs 24t protrude toward one side in the width direction Y (right side in FIG. 4). The negative electrode tabs 24t protrude further in the width direction Y than the separator 26. The negative electrode tabs 24t are spaced (intermittently) along the longitudinal direction of the negative electrode plate 24. The negative electrode tabs 24t each have a trapezoid shape. Each negative electrode tab 24t is part of the negative electrode current collector foil 24c, and made of a metal foil (e.g., a copper foil). The negative electrode tabs 24t are portions (current collector foil exposing portion) of the negative electrode current collector foil 24c where the negative electrode active material layer 24a is not formed. However, the negative electrode tabs 24t may be members separate from the negative electrode current collector foil 24c.

Figure 5:
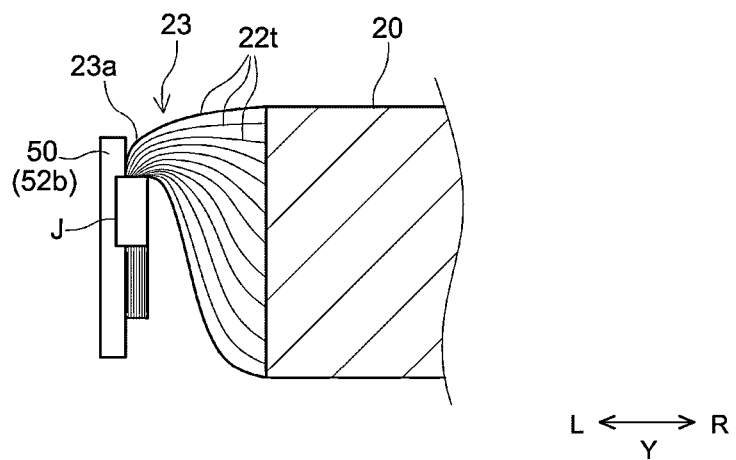
FIG. 5 is a partial sectional view illustrating bonding between the positive electrode tab group 23 and the positive electrode current collector 50, viewed from the sealing plate 14.

By the above-described winding, the positive electrode tabs 22t protruding from the first end 201 are stacked, thereby forming a positive electrode tab group 23. FIG. 5 is a partial sectional view illustrating bonding between the positive electrode tab group 23 and the positive electrode current collector 50, viewed from the sealing plate 14. As shown in FIGS. 1 to 5, the tips of the positive electrode tabs 22t constituting the positive electrode tab group 23 are bent so as to be arranged along the short side wall 12c. By the above-described bending, a positive electrode bend 23a is formed in the positive electrode tab group 23. Portions of the positive electrode tabs 22t bent are bonded to the positive electrode current collector 50 (specifically, the tab bonding portion 52b). Specifically, portions of the positive electrode tabs 22t closer to their tips than the positive electrode bend 23a are bonded to the positive electrode current collector 50, and a bonding portion J between the positive electrode tabs 22t and the positive electrode current collector 50 is formed. As means for the bonding, ultrasound welding, resistance welding, laser welding, or the like may be used, for example (the same applies to the negative electrode).

By the above-described winding, the negative electrode tabs 24t protruding from the second end 202 are stacked, thereby forming a negative electrode tab group 25. Although detailed illustration is omitted, the tips of the negative electrode tabs 24t constituting the negative electrode tab group 25 are bent so as to be arranged along the short side wall 12c. By the above-described bending, a negative electrode bend is formed in the negative electrode tab group 25. Portions of the negative electrode tabs 24t bent are bonded to the negative electrode current collector 60 (specifically, the tab bonding portion 62b in FIG. 12). Specifically, portions of the negative electrode tabs 24t closer to their tips than the negative electrode bend are bonded to the negative electrode current collector 60, and a bonding portion between the negative electrode tabs 24t and the negative electrode current collector 60 is formed.

As shown in FIG. 3, the positive electrode current collector 50 includes a positive electrode first current collector 51 and a positive electrode second current collector 52. The positive electrode first current collector 51 has an L-shaped cross section. The positive electrode first current collector 51 includes a terminal connection portion 51a arranged along the inner surface of the sealing plate 14, and a lead portion 51b extending from one end of the terminal connection portion 51a in the width direction Y toward the bottom wall 12a. The terminal connection portion 51a has a through hole at a position corresponding to the terminal outlet 18 of the sealing plate 14. The shaft 32 of the positive electrode terminal 30 is inserted into the through hole.

As shown in FIGS. 2 and 3, the positive electrode second current collectors 52 extends toward the bottom wall 12a of the exterior body 12. The positive electrode second current collector 52 includes a first current collector connection portion 52a and a tab bonding portion 52b. The first current collector connection portion 52a is electrically connected to the positive electrode first current collector 51. The first current collector connection portion 52a extends along the up-down direction Z. The first current collector connection portion 52a is arranged substantially perpendicular to the winding axis WL of each electrode body 20. The tab bonding portion 52b is bonded to the multiple positive electrode tabs 22t. The tab bonding portion 52b extends along the up-down direction Z. The tab bonding portions 52b are arranged substantially perpendicular to the winding axes WL of the electrode body 20. The surface of the tab bonding portion 52b connected to the positive electrode tabs 22t is arranged substantially parallel with the short side walls 12c of the exterior body 12.

As shown in FIGS. 2 and 3, the negative electrode current collector 60 includes a negative electrode first current collector 61 and a negative electrode second current collector 62. The negative electrode first current collector 61 includes a terminal connection portion 61a and a lead portion 61b. The negative electrode second current collector 62 includes a first current collector connection portion 62a and a tab bonding portion 62b (see FIG. 12). The configuration of the negative electrode current collector 60 is the same as that of the positive electrode current collector 50. Thus, the detailed description thereof is omitted herein.

As shown in FIG. 2, the electrode body holder 29 includes a rectangular bottom surface 291, a pair of wide surfaces 292 extending from the bottom surface 291 and facing each other, and a pair of narrow surfaces 294 extending from the bottom surface 291 and facing each other. The electrode body holder 29 has an internal space 29s housing the electrode body 20, and has an opening 29h communicating with the internal space 29s. The electrode body 20 is housed in the internal space 29s of the electrode body holder 29. The electrode body holder 29 houses a positive electrode tab group 23, a positive electrode current collector 50 bonded to the positive electrode tab group 23, a negative electrode tab group 25, and a negative electrode current collector 60 bonded to the negative electrode tab group 25. With the electrode body 20 housed in the internal space 29s of the electrode body holder 29, the first side surface 20a faces the wide surfaces 292, and the second side surface 20b faces the narrow surfaces 294. At this time, the positive electrode second current collector 52 of the positive electrode current collector 50 and the negative electrode second current collector 62 of the negative electrode current collector 60 (see FIG. 12) face the narrow surfaces 294. With the electrode body holder 29 housed in the exterior body 12, the wide surfaces 292 of the electrode body holder 29 face the long side walls 12b of the exterior body 12, the narrow surfaces 294 face the short side walls 12c, and the bottom surface 291 faces the bottom wall 12a.

Figure 6:
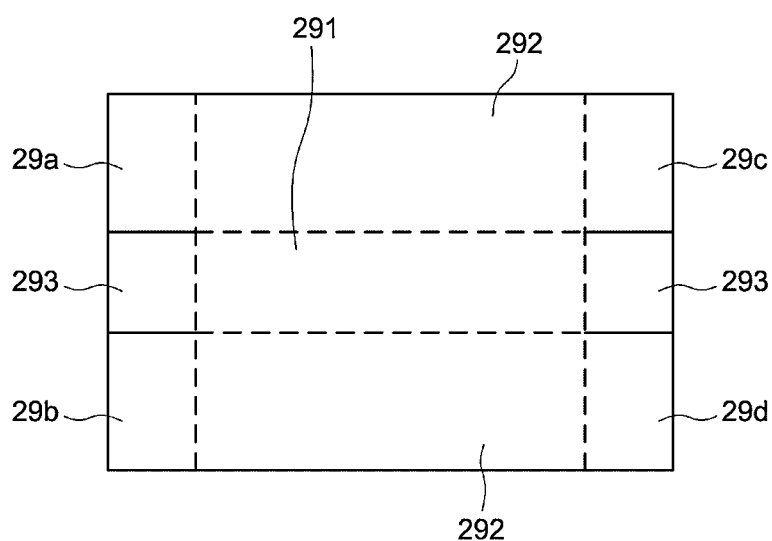
FIG. 6 is a development view of the electrode body holder 29 used in an embodiment.

Although not particularly limited thereto, the electrode body holder 29 used may be obtained by bending and molding, for example, a resin film (e.g., a resin film such as polypropylene (PP)). FIG. 6 is a development view of the electrode body holder 29 used in an embodiment. As shown in FIG. 6, in the developed state, the electrode body holder 29 includes a bottom surface 291, a pair of wide surfaces 292 extending from a pair of longer sides of the bottom surface 291 facing each other, a pair of bottom surface adjacent portions 293 extending from a pair of shorter sides of the bottom surface 291 facing each other, and narrow surface forming portions 29a to 29d extending from short sides of the wide surfaces 292. The electrode body holder 29 is molded by bending it in the same direction along the dotted lines in FIG. 6.

In the electrode body holder 29 molded as described above, one narrow surface 294 is formed of narrow surface forming portions 29a and 29b and a bottom surface adjacent portion 293. Specifically, for example, first, the bottom surface adjacent portion 293 is bent. Subsequently, the narrow surface forming portion 29a is bent over the bottom surface adjacent portion 293 bent. Then, the narrow surface forming portion 29b is bent over the narrow surface forming portion 29a bent. Accordingly, one narrow surface 294 is formed. At this time, the resin film shown in FIG. 6 is bent so that the bottom surface adjacent portion 293, the narrow surface forming portion 29a, and the narrow surface forming portion 29b are overlaid in this order from the inside to the outside of the electrode body holder 29. The other narrow surface 294 is formed of narrow surface forming portions 29c and 29d and a bottom surface adjacent portion 293. Specifically, for example, first, the bottom surface adjacent portion 293 is bent. Subsequently, the narrow surface forming portion 29c is bent over the bottom surface adjacent portion 293 bent. Then, the narrow surface forming portion 29d is bent over the narrow surface forming portion 29a bent. Accordingly, the other narrow surface 294 is formed. At this time, the resin film is bent so that the bottom surface adjacent portion 293, the narrow surface forming portion 29c, and the narrow surface forming portion 29d are overlaid in this order from the inside to the outside of the electrode body holder 29.

In the battery 1, the electrode body 20 is fixed to the inner wall surface of the electrode body holder 29. Since the electrode body 20 is fixed to the inner wall surface of the electrode body holder 29, if external forces such as vibrations and shock are applied to the battery 1, movement of the electrode body in the exterior body (specifically, the movement in the width direction Y) can be reduced. This allows reduction in load on the electrode tabs due to the movement of the electrode body and reduction in damage to the electrode tab group. With this configuration, an effect of reducing movement of the electrode body and the effect of reducing damage to the electrode tab group can be achieved.

Figure 7:
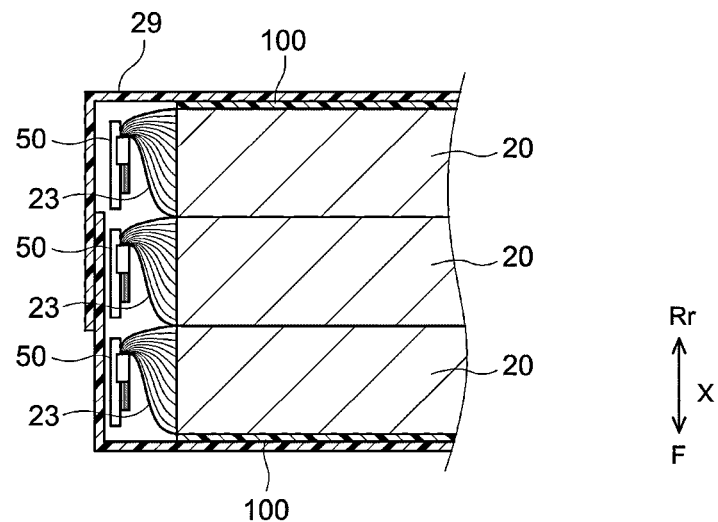
FIG. 7 is a partial sectional view illustrating the state in which the electrode body 20 is fixed to the inner wall surface of the electrode body holder 29, viewed from the sealing plate 14 of the battery 1 according to an embodiment.

The means for the fixing can be, for example, forming an adhesive layer having adhesiveness. FIG. 7 is a partial sectional view illustrating the state in which the electrode body 20 is fixed to the inner wall surface of the electrode body holder 29, viewed from the sealing plate 14 of the battery 1 according to an embodiment. In FIG. 7, illustration of the exterior body 12 and the sealing plate 14 is omitted. As shown in FIGS. 2 and 7, the battery 1 includes a first adhesive layer 100 between the first side surface 20a of the electrode body 20 and the inner wall surface of the electrode body holder 29 (specifically, the inner surface of one or both wide surfaces 292 of the electrode body holder 29, both in FIG. 7), and the electrode body 20 is fixed to the inner wall surface with the first adhesive layer 100 interposed therebetween. The first adhesive layer 100 is provided in two electrode bodies facing the wide surfaces 292 of the electrode body holder 29 among the three electrode bodies housed in the electrode body holder 29. With the first adhesive layer 100 formed on this portion, an effect of reducing movement of the electrode body and the effect of reducing damage to the electrode tab group can be achieved.

Figure 8:
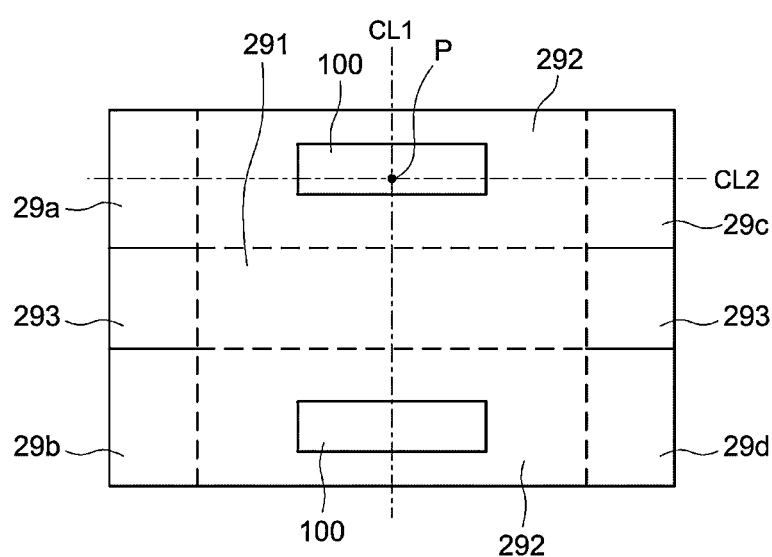
FIG. 8 is a development view of the electrode body holder 29 shown in FIG. 7.

Although not particularly limited thereto, the first adhesive layer 100 is preferably provided in at least part of the inner wall surface (e.g., the inner surfaces of the wide surfaces 292) of the electrode body holder 29. FIG. 8 is a development view of the electrode body holder 29 shown in FIG. 7. Specifically, as shown in FIG. 8, for example, the first adhesive layer 100 is provided by, for example, applying a material for forming the first adhesive layer 100 (e.g., a slurry, a paste, and the like containing a resin material to be described later) to the wide surface 292 of the resin film before molding, then drying the material, as appropriate, and subjecting the material to a predetermined process, or the first adhesive layer 100 may be provided by means of adhering an adhesive tape (including pressure-sensitive adhesive tape. Thus, an electrode body holder 29 including a first adhesive layer 100 on the wide surface 292 can be produced. With the first adhesive layer 100 provided in the electrode body holder 29, an effect of reducing movement of the electrode body and the effect of reducing damage to the electrode tab group can be achieved. In addition, formation of the first adhesive layer 100 in the electrode body 20 can be omitted. Further, for example, the risk of contact with the first adhesive layer 100 during the manufacturing process can be reduced. How to provide the first adhesive layer 100 in the electrode body holder 29 will be described in detail later.

As the constituent material for the first adhesive layer 100, various resin materials having adhesiveness (or adhesion), which are used as a binder in this kind of secondary battery can be used. Examples of the resin material include: fluorine resins such as polyvinylidene fluoride (PVDF) and polytetrafluoroethylene (PTFE); an acrylic resin; a polyamide resin; a polyimide resin; and polyurethane resin. In order to facilitate the manufacturing of the battery 1, various adhesives (pressure-sensitive adhesives) may be suitably used as the constituent material for the first adhesive layer 100. Examples of the adhesive include acryl adhesives, rubber-based adhesives, silicone-based adhesives, and urethan-based adhesives. Alternatively, the resin material may be a photocurable resin (e.g., a photocurable acrylic resin) or a thermosetting resin (e.g., a thermosetting acrylic resin).

A region of the wide surface 292 of the electrode body holder 29 where the first adhesive layer 100 is formed (hereinafter also referred to as a "first adhesive layer forming region") is not particularly limited as long as the effects of the technology disclosed herein can be achieved. As an example, as shown in FIG. 8, the central region including the point P of intersection between the center line CL1 of the wide surfaces 292 in the long side direction and the center line CL2 of the wide surfaces 292 in the shorter side can be the first adhesive layer forming region. The area of the central region (i.e., the first adhesive layer forming region) can be, for example, ½ or less, ⅓ or less, ¼ or less, or ⅕ or less of the area of the first side surface 20a of the electrode body 20. In light of efficient impregnation of the electrolyte into the electrode body 20, the area of first adhesive layer forming region is preferably ⅓ or less of the area of the first side surface 20a. As described above, the central region needs only include the point P of intersection, and the center of the central region and the point P of intersection may not coincide with each other. In light of the impregnation of the electrolyte into the electrode body 20, the center of the central region may be closer to the opening 29h (i.e., the side opposite to the bottom surface 291, also see FIG. 2) than the point P of intersection. The area of the first adhesive layer forming region means the area of one first side surface 20a.

Figure 9:
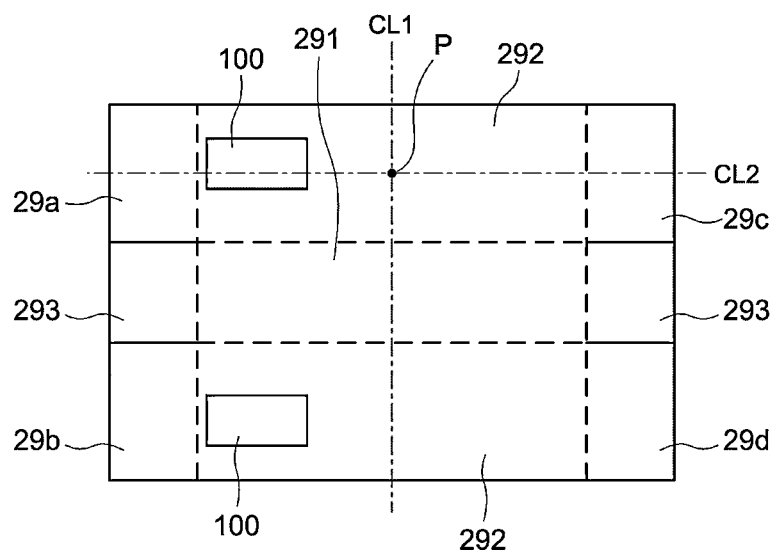
FIG. 9 is a development view illustrating an example of a portion of the electrode body holder 29 of the battery 1 according to an embodiment where the adhesive layer 100 is provided.

Alternatively, the first adhesive layer forming region may be a region near the electrode tab group. FIG. 9 is a development view illustrating an example of a portion of the electrode body holder 29 of the battery 1 according to an embodiment where the adhesive layer 100 is provided. In the resin film shown in FIG. 9, the region near the electrode tab group which is located closer to the electrode tabs than the center line CL1 of the wide surface 292 in the long side direction after forming the electrode body holder 29 can be the first adhesive layer forming region. For example, forming a first adhesive layer 100 in a region near the positive electrode tab group is preferred when the positive electrode tabs 22t are made of materials that are more easily damaged than the material for the negative electrode tabs 24t. The first adhesive layer 100 may be formed in a region near the negative electrode tab group, or in both of the region near the positive electrode tab group and a region near the negative electrode tab group, or in another region where the formation is desired such as the central region in addition to the region near the electrode tabs. If the first adhesive layer 100 is provided in multiple portions, the sum of the areas of the first adhesive layer forming regions may be set within the above-described range.

On the other hand, although detailed illustration is omitted, the first adhesive layer 100 may be provided on at least a portion of the first side surface 20a of the electrode body 20. Specifically, the first adhesive layer 100 may be provided by the following means: applying a material for forming the first adhesive layer 100 (e.g., a slurry or a paste containing the resin material to be described later) to a predetermined portion of the first side surface 20a of the electrode body 20 before inserted into the electrode body holder 29, then drying the material, as appropriate, and subjecting the material to a predetermined process; or adhering an adhesive tape (including a pressure-sensitive adhesive tape); or the like, for example. Also in this case, the effect of reducing movement of the electrode body and the effect of reducing damage to the electrode tab group can be achieved. The first adhesive layer 100 provided in the portion allows omission of the first adhesive layer 100 arranged in the electrode body holder 29. Thus, the resin films before forming the electrode body holder 29 in the manufacturing can be stacked. The first adhesive layer forming region on the first side surface 20a is only necessary to match the region on the wide surface 292 of the electrode body holder 29 after housing the electrode body 20. The area of the first adhesive layer 100 may be the same as that when the first adhesive layer 100 is provided on the wide surface 292 of the electrode body holder 29.

If the adhesiveness between the electrode body 20 and the electrode body holder 29 is desired to be improved, the first adhesive layer 100 may be provided on both the first side surface 20a of the electrode body 20 and the inner surface of the wide surface 292 of the electrode body holder 29. In FIG. 7, the first adhesive layer 100 is provided between the inner surface of each wide surfaces 292 and the first side surface 20a. However, the first adhesive layer 100 may be provided on one side if the effect of the technology disclosed herein can be sufficiently achieved.

OTHER EMBODIMENTS

Figure 10:
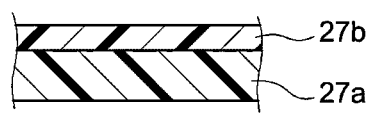
FIG. 10 is a partial sectional view illustrating a configuration of the adhesive separator 27 used in the battery 1 according to an embodiment.

In the above-described embodiment, a separate adhesive layer (i.e., the first adhesive layer 100) is provided between the first side surface 20a of the electrode body 20 and the inner wall surface (the inner surface of the wide surfaces 292) of the electrode body holder 29. Thus, the fixation between the electrode body 20 and the electrode body holder 29 is achieved. However, the fixation is not limited thereto. For example, the fixation can be achieved by using a separator (hereinafter referred to as an "adhesive separator") including an adhesive layer as part of the separator 26 of the electrode body 20. FIG. 10 is a partial sectional view illustrating a configuration of the adhesive separator 27 used in the battery 1 according to an embodiment. Specifically, the battery 1 according to the present embodiment includes, as at least a portion of the separator 26 shown in FIG. 4, an adhesive separator 27 including a substrate 27a and a second adhesive layer 27b provided on at least part of the surface of the substrate 27a. Here, at least part of the second adhesive layer 27b constitutes the first side surface 20a, and the electrode body 20 is fixed to the inner wall surface of the electrode body holder 29 with the second adhesive layer 27b interposed therebetween. This achieves an effect of reducing movement of the electrode body and the effect of reducing damage to the electrode tab group. This further allows omission of the process of providing a separate adhesive layer 100 on the first side surface 20a or the inner wall surface of the electrode body holder 29. Further, the adhesive layer 100 is not formed on the inner wall surface of the electrode body holder 29. Thus, the resin films before forming the electrode body holder 29 in the manufacturing can be stacked. If the battery 1 includes multiple electrode bodies 20, the second adhesive layer 27b of the adhesive separator 27 allows improvement in adhesiveness between the electrode bodies 20, and allows reduction in displacement from each other.

The substrate 27a of the adhesive separator 27 may be, for example, fine porous thin film, woven fabric, and nonwoven fabric. The constituent material for the substrate can be, for example, preferably polyethylene, polypropylene, and polyolefins such as a copolymer of polyethylene and a olefin. The substrate 27a may have a monolayer structure, or a multilayer structure (e.g., polyethylene/polypropylene/polyethylene).

The second adhesive layer 27b may be formed on both surfaces or one surface of the substrate 27a (in FIG. 10, both surfaces). Here, in the electrode body 20 shown in FIG. 4, when the positive electrode plate 22, the negative electrode plate 24, and the separator 26 are stacked and then wound, the outermost layer of the electrode body 20 is the separator 26. Thus, at least, the separator 26 constituting the outermost layer may be replaced with the adhesive separator 27, and the winding may then be performed so that the adhesive separator 27 is arranged such that the second adhesive layer 27b is the outermost layer of the members in the electrode body 20 in the stacking direction (i.e., the outermost layer of the electrode body 20 after winding). Although not particularly limited thereto, the second adhesive layer 27b may be formed substantially over the entire surface of the substrate 27a. In other words, the area of the second adhesive layer 27b on the first side surface 20a may be substantially the same as the area of the first side surface 20a. Accordingly, the adhesive separator 27 and the positive electrode active material layer 22a are adhered to each other with the second adhesive layer 27b interposed therebetween after the winding. In addition to the effect of reducing movement of the electrode body and the effect of reducing damage to the electrode tab group, the effect of reducing a distance between the positive and negative electrodes, the effect of reducing deformation of the electrode body 20 can be achieved. Similarly to the first adhesive layer 100, the second adhesive layer 27b may be formed such that the area of the second adhesive layer 27b on the first side surface 20a is ½ or less, ⅓ or less, ¼ or less, or ⅕ or less of the area of the first side surface 20a.

As the constituent material for the second adhesive layer 27b, various resin materials having adhesion (or adhesiveness) can be used. Examples of the resin material include: fluorine resins such as polyvinylidene fluoride (PVDF) and polytetrafluoroethylene (PTFE).

In light of further improving the state of fixation between the electrode body 20 and the electrode body holder 29, the adhesive separator 27 may be used as a separator constituting the outermost layer of the electrode body 20, and the adhesive layer 100 of the embodiment may be provided on the inner wall surface of the electrode body 20 and/or the electrode body holder 29.

The means of the fixation is not limited to formation of the adhesive layer 100 and the use of the adhesive separator 27, and other means may be employed. For example, as will be described later, the first side surface 20a of the electrode body 20 and the wide surface 292 of the electrode body holder 29 may be fixed to each other by ultrasonic bonding. In this case, weld marks of the ultrasonic bonding can be present on at least part of the outer surface of the wide surface 292.

<<Method of Manufacturing Battery 1>>

Figure 11:
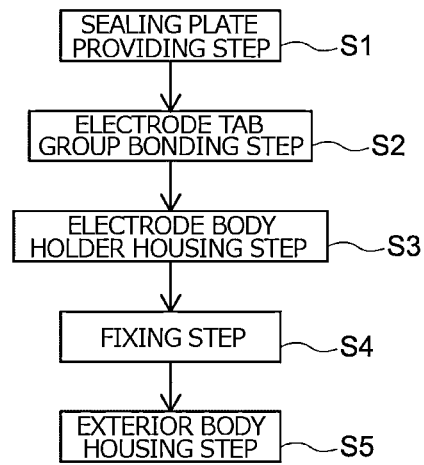
FIG. 11 is a diagram illustrating a method of manufacturing a battery 1 according to an embodiment.
Figure 12:
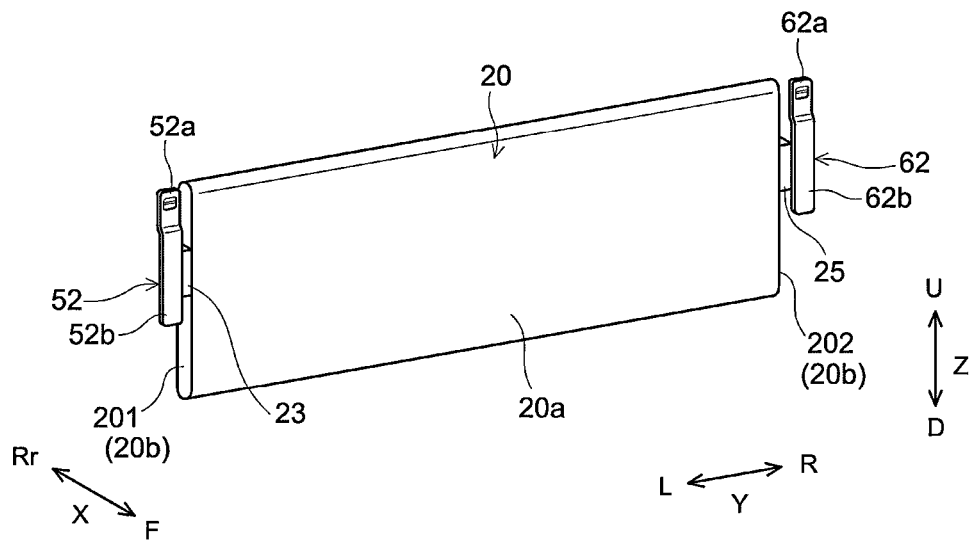
FIG. 12 is a perspective view illustrating a step of the method of manufacturing the battery 1 according to an embodiment.
Figure 13:
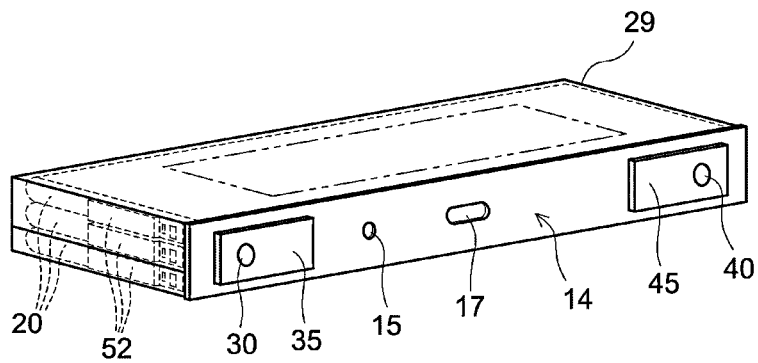
FIG. 13 is a perspective view illustrating another step of the method of manufacturing the battery 1 according to an embodiment.
Figure 14:
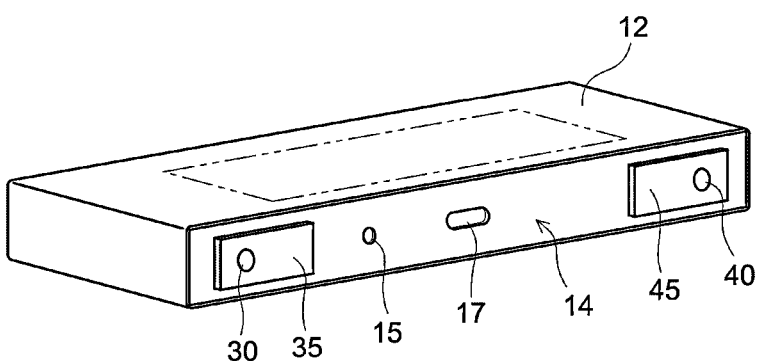
FIG. 14 is a perspective view illustrating another step of the method of manufacturing the battery 1 according to an embodiment.

FIG. 11 is a diagram illustrating a method of manufacturing a battery 1 according to an embodiment. FIGS. 12 to 14 are perspective views illustrating steps of the method of manufacturing the battery 1 according to an embodiment. In the method of manufacturing the battery 1, first, a battery case 10 (an exterior body 12 and a sealing plate 14), an electrode body 20 (one or more, e.g., three), an electrolyte, an electrode body holder 29, a positive electrode terminal 30, a negative electrode terminal 40, a positive electrode current collector 50, and a negative electrode current collector 60 are provided. Then, as shown in FIG. 11, a sealing plate providing step S1, an electrode tab group bonding step S2, an electrode body holder housing step S3, a fixing step S4, and an exterior body housing step S5 are performed, thereby manufacturing a battery 1. The manufacturing method disclosed herein may further include other processes at any stage. In the following description, reference is made to FIGS. 1-14, as appropriate.

In the sealing plate providing step S1, a positive electrode terminal 30, a negative electrode terminal 40, a positive electrode current collector 50, and a negative electrode current collector 60 are attached to the sealing plate 14, and then, the sealing plate 14 is provided in a state where the electrode body 20 can be attached. Specifically, first, a positive electrode terminal 30, a positive electrode first current collector 51, a negative electrode terminal 40, a negative electrode first current collector 61, and an insulator 70 are attached to the sealing plate 14. The positive electrode terminal 30, the positive electrode first current collector 51, and the insulator 70 are fixed to the sealing plate 14 by crimping processing (riveting), for example. The crimping processing is performed such that, as shown in FIG. 3, a gasket 90 is sandwiched between the outer surface of the sealing plate 14 and the positive electrode terminal 30, and an insulator 70 is sandwiched between the inner surface of the sealing plate 14 and the positive electrode first current collector 51. Specifically, the positive electrode terminal 30 before crimping processing is inserted, from above the sealing plate 14, into the through hole of the gasket 90, the terminal outlet 18 of the sealing plate 14, the through hole of the insulator 70, and the through hole of the positive electrode first current collector 51 in this order to protrude downward the sealing plate 14. Then, a portion of the positive electrode terminal 30 protruding downward from the sealing plate 14 is crimped so that a compressive force is applied against the up-down direction Z. In this manner, the gasket 90, the sealing plate 14, the insulator 70, and the positive electrode first current collector 51 are fixed integrally to the sealing plate 14. The negative electrode side is similar to the positive electrode side. Thus, detailed description thereof is omitted.

In the electrode tab group bonding step S2, the electrode tab group corresponding to the electrode current collector of the sealing plate 14 provided in the sealing plate providing step S1 is bonded so that the sealing plate 14 is integral with the electrode body 20. Specifically, first, as shown in FIG. 12, three electrode bodies 20 each with the positive electrode second current collectors 52 and the negative electrode second current collector 62 are provided. Then, the three electrode bodies 20 are arranged along the short side direction X (see FIG. 2). At this time, the three electrode bodies 20 are arranged so that the positive electrode second current collector 52 is arranged on one side in the long side direction Y (left side in FIG. 2), and the negative electrode second current collector 62 is arranged on the other side in the long side direction Y (right side in FIG. 2).

Subsequently, the positive electrode tab group 23 which has been integrated with the positive electrode second current collectors 52 is bent. Specifically, the tips of the positive electrode tabs 22t constituting the positive electrode tab group 23 are bent. Then, with the positive electrode tab group 23 bent, the positive electrode second current collectors 52 (first current collector connection portion 52a) is bonded to the lead portion 51b of the positive electrode first current collector 51 fixed to the sealing plate 14 provided in the step S1. The bonding method used can be, for example, welding such as ultrasound welding, resistance welding, and laser welding. The negative electrode side is similar to the positive electrode side. Thus, detailed description thereof is omitted. In this manner, three electrode bodies 20 are bonded to the sealing plate 14. Thus, an integrated body 2 of the electrode bodies 20 and the sealing plate 14 is obtained such as shown in FIG. 2.

In the electrode body holder housing step S3, the integrated body 2 prepared in the electrode tab group bonding step S2 is housed in the electrode body holder 29. Here, the electrode bodies 20 are housed in the electrode body holder 29 with the positive electrode tab group 23 and the negative electrode tab group 25 being bonded to the respective current collectors. Specifically, for example, the resin film shown in FIG. 8 or 9 is bent as described above, thereby producing a bag-shaped (box-shaped) electrode body holder 29. The integrated body 2 is inserted into the electrode body holder 29 so that the first side surfaces 20a of the electrode bodies 20 face the wide surfaces 292 of the electrode body holder 29 (see FIG. 13). The integrated body 2 may be produced by stacking the electrode bodies 20 on the resin film before molding so that the first side surfaces 20a face the wide surfaces 292 and wrapping it.

In the fixing step S4, pressure and/or energy is applied to the electrode body holder 29 housing the electrode bodies 20 and fixing the first side surface 20a to the inner wall surface of the electrode body holder 29. As described above, first adhesive layer 100 is provided on at least a portion of the wide surface 292 in the resin film shown in FIG. 8 or 9. The pressure and/or energy may be applied to the first adhesive layer forming region (e.g., a region surrounded by a double-dotted line in FIG. 13, see also FIG. 8) from the outer surface of the wide surface 292 of the electrode body holder 29. The magnitude of pressure, type of energy, and amount of energy can be changed, as appropriate, depending on the size of the first adhesive layer forming region, the constituent material of the first adhesive layer 100, and the constituent material of the electrode body 20. For example, if the first adhesive layer 100 is made of an adhesive (pressure-sensitive adhesive), the fixation through the first adhesive layer 100 can be achieved by applying pressure to the region. The magnitude of the pressure is not particularly limited as long as the fixation through the first adhesive layer 100 is realized, and may be between 0.01 kgf/cm² and 0.05 kgf/cm², for example, or about finger pressure. If necessary, heating (e.g., between 40° C. to 60° C.) may be performed when the pressure is applied.

For example, when the first adhesive layer 100 is formed using thermosetting resin or other resin material, it is preferable to apply heat (e.g., between 60° C. to 70° C.) while applying a predetermined magnitude of pressure (e.g., between 0.05 kgf/cm² to 0.2 kgf/cm²) to apply thermal energy for curing or heat-weld the resin. The temperature at the time of the heating can be changed, as appropriate, depending on the type of resin material used. When the first adhesive layer 100 is formed using photocurable resin, it is preferable to apply optical energy to cure the resin while applying a predetermined magnitude of pressure (e.g., between 0.01 kgf/cm² and 0.1 kgf/cm²). The type (wavelength) of light applied is not particularly limited, and it depends on the type of photocurable resin. For example, if the photocurable resin is ultraviolet light curable resin, ultraviolet light may be applied. Alternatively, if the photocurable resin is resin cured by visible light, visible light with a wavelength at which the resin can be cured may be applied. If the first adhesive layer 100 is formed of thermosetting resin or photocurable resin, application of the pressure may be omitted.

When the fixing step S4 is performed before the exterior body housing step S5 to be described later, the bonding state between the electrode bodies 20 and the electrode body holder 29 can be visually checked. Further, the pressure on the exterior body 12 and the damage due to the thermal energy can be reduced.

In the exterior body housing step S5, the electrode bodies 20 which have been fixed to the inner wall surfaces of the electrode body holder 29 by the fixing step S4 are housed in the exterior body 12 (see FIG. 2). Then, the sealing plate 14 is bonded to the edge of the opening 12h of the exterior body 12 to seal the opening 12h. The exterior body 12 and the sealing plate 14 are preferably bonded to each other by welding. The bonding by welding can be performed by, for example, laser welding. An electrolyte is then injected through a liquid injection hole 15, and the liquid injection hole 15 is closed by the sealing member 16. Thus, a battery 1 is sealed. In this manner, a battery 1 can be manufactured.

Other Embodiments

In the above-described embodiment, the fixing step S4 is performed before the exterior body housing step S5, but is not limited thereto. In other words, the fixing step may be performed after the exterior body housing step. Specifically, after the electrode body 20 is housed in the electrode body holder 29 in the above electrode body holder housing step S3, this electrode body holder 29 is housed in the exterior body 12 without applying pressure or energy. Thereafter, the opening 12h of the exterior body 12 is sealed with the sealing plate 14. After the sealing, pressure and/or energy (e.g., thermal energy) is applied to a predetermined region of the long side wall 12b of the exterior body 12 (including the region where the adhesive layer 100 is formed, e.g., the region surrounded by a double-dotted line in FIG. 14), so that the electrode bodies 20 and the electrode body holder 29 are fixed to each other. When the fixing step is performed after the exterior body housing step, damage to the electrode tab group due to application of pressure or energy can be reduced. Various conditions for the pressure and the energy are the same as described in the embodiment. Thus, the description thereof is omitted.

In the embodiment, electrode body holder 29 in which the adhesive layer 100 is formed is used, but is not limited thereto. In other words, an adhesive separator 27 may be used. In this case, an adhesive separator 27 including a substrate 27a and a second adhesive layer 27b provided in at least a portion of the surface of the substrate 27a is used as a portion of the separator constituting the battery 1 to be manufactured, at least a portion of the second adhesive layer 27b constitutes the first side surface 20a, and the first side surface 20a and the inner wall surface of the electrode body holder 29 are fixed to each other with the second adhesive layer 27b interposed therebetween. The magnitude of pressure applied during the fixation can be, for example, between 0.1 kgf/cm² and 0.2 kgf/cm². The temperature for the heating during the fixation can be any temperature at which it is possible to perform thermal welding by the resin material constituting the second adhesive layer, and is, for example, between 60° C. and 80° C.

Alternatively, the first side surface 20a of the electrode body 20 and the inner wall surface of the electrode body holder 29 may be fixed to each other by applying ultrasonic energy. In this case, formation of the first adhesive layer 100 and the use of the adhesive separator 27 can be omitted. When ultrasonic energy is applied to the wide surfaces 292 of the electrode body holder 29 while applying pressure to the region to be fixed by using a commercially available device, the fixation can be achieved (e.g., see a region surrounded by a double-dotted line in FIG. 13). If a material for which application of thermal energy is undesirable is used as the constituent material for the electrode body 20, it is preferred to apply ultrasonic energy to achieve the fixation. By changing the frequency of the ultrasound, as appropriate, only the fixation of the first side surface 20a (separator) of the electrode body 20 and the inner wall surface of the electrode body holder 29 to each other can be achieved without causing damage to the constituent material for the electrode body 20, for example.

Although specific examples of the technology disclosed herein have been described in detail above, they are mere examples and do not limit the appended claims. The technology described in the appended claims include various modifications and changes of the foregoing specific examples.

What is claimed is:
1. A battery, comprising:
an exterior body comprising a bottom wall, a pair of first side walls extending from the bottom wall and facing each other, a pair of second side walls extending from the bottom wall and facing each other, and an opening facing the bottom wall;
a sealing plate sealing the opening;
an electrode body housed in the exterior body and comprising a positive electrode, a negative electrode, and a separator separating between the positive electrode and the negative electrode;

an electrode body holder housing the electrode body, made of resin, and housed in the exterior body with the electrode body housed in the electrode body holder;

a positive electrode terminal and a negative electrode terminal which are attached to the sealing plate; and a positive electrode current collector which electrically connects between the positive electrode and the positive electrode terminal of the electrode body and a negative electrode current collector which electrically connects between the negative electrode and the negative electrode terminal of the electrode body, wherein the electrode body comprises a pair of first side surfaces facing the first side walls, at a first end of the electrode body in a facing orientation of the first side surfaces, a positive electrode tab group including multiple positive electrode tabs protruding from the first end is provided, at a second end of the electrode body different from the first end in a facing orientation of the first side surfaces, a negative electrode tab group including multiple negative electrode tabs protruding from the second end is provided, in the positive electrode tab group, tips of the positive electrode tabs constituting the positive electrode tab group are bent so as to be arranged along one of the second side walls, and portions of the positive electrode tabs bent are bonded to the positive electrode current collector, in the negative electrode tab group, tips of the negative electrode tabs constituting the negative electrode tab group are bent so as to be arranged along the other second side wall, and portions of the negative electrode tabs bent are bonded to the negative electrode current collector, the electrode body is fixed to an inner wall surface of the electrode body holder, a first adhesive layer is arranged between at least one of the first side surfaces of the electrode body and the inner wall surface of the electrode body holder, the electrode body is fixed to the inner wall surface with the first adhesive layer interposed therebetween, an area of the first adhesive layer is $\frac{1}{3}$ or less of an area of the first side surface, the positive electrode tabs are made of aluminum foils, the electrode body holder includes a pair of surfaces facing the pair of first side surfaces of the electrode body, and a region where the first adhesive layer is arranged is located closer to the positive electrode tabs than a center line of the pair of surfaces in a long side direction of the electrode body holder.

* * * * *